United States Patent [19]

Rosen et al.

[11] Patent Number: 4,647,962

[45] Date of Patent: Mar. 3, 1987

[54] METHOD AND APPARATUS FOR GENERATING A HALF-TONE IMAGE REPRESENTATION WITH INDIVIDUAL GROUPS OF ONE OR MORE SCANNING BEAMS CONTROLLED IN RESPONSE TO HALF-TONE DOT INFORMATION AND EITHER LOW-OR HIGH-RESOLUTION IMAGE DATA

[75] Inventors: Martin Rosen, Barnet; George C. Manley, North Harrow, both of England

[73] Assignee: Crosfield Electronics Limited, London, England

[21] Appl. No.: 686,793

[22] Filed: Dec. 26, 1984

[30] Foreign Application Priority Data

Jan. 25, 1984 [GB] United Kingdom ................. 8401933

[51] Int. Cl.[4] .......................... H04N 1/46; H04N 1/21; H04N 1/23; H04N 1/40
[52] U.S. Cl. ...................................... 358/78; 358/75; 358/283; 358/298
[58] Field of Search ................... 358/75, 78, 280, 283, 358/298

[56] References Cited

U.S. PATENT DOCUMENTS

| | | | |
|---|---|---|---|
| 4,004,079 | 1/1977 | Boston | 358/283 |
| 4,135,212 | 1/1979 | Pugsley et al. | 358/298 |
| 4,276,567 | 6/1981 | Wellendorf et al. | 358/283 |
| 4,320,419 | 3/1982 | Cottriall | 358/75 |
| 4,496,989 | 1/1985 | Hirosawa | 358/280 |
| 4,516,139 | 5/1985 | Takiguchi | 358/298 |
| 4,553,172 | 11/1985 | Yamada et al. | 358/298 |

FOREIGN PATENT DOCUMENTS 2102240  1/1983  United Kingdom .................. 358/75

Primary Examiner—James J. Groody
Assistant Examiner—Randall S. Svihla
Attorney, Agent, or Firm—Sughrue, Mion, Zinn, Macpeak and Seas

[57] ABSTRACT

A method and apparatus for generating a representation of a half-tone image including areas of different resolution. The apparatus comprises stores (2, 26) for storing digital color data representing color density information at low and high resolution respectively. A second store (25) stores spatial data indicating the type of image data to be used at each position on a record medium (7). A third store (2') is provided for storing half-tone dot information. A group of six light modulators (10) which generate six scanning beams are arranged side-by-side. A support (8) supporting the record medium (7) to be exposed to the scanning beams is provided while drive motors (6',9') cause relative movement between the support and the scanning beam. Scanning beam control means (25,27-32) determine the position of the beams relatively to the record medium (7) in use, compare the current position with the stored spatial data and control the beam in response to the previously generated digital color data and in response to the half-tone dot information. The plurality of beams are controlled together and at a first rate in response to low resolution data and singly or in groups and at a higher, second rate in response to high resolution image data.

8 Claims, 6 Drawing Figures

METHOD AND APPARATUS FOR GENERATING A HALF-TONE IMAGE REPRESENTATION WITH INDIVIDUAL GROUPS OF ONE OR MORE SCANNING BEAMS CONTROLLED IN RESPONSE TO HALF-TONE DOT INFORMATION AND EITHER LOW-OR HIGH-RESOLUTION IMAGE DATA

BACKGROUND OF THE INVENTION

The invention relates to a method and apparatus for generating a representation of a half-tone image.

In a typical system, such as that embodied in our Crosfield Magnascan 645, a record medium mounted on a rotating cylinder is exposed to a plurality (usually six) of scanning beams arranged side by side. During scanning, the cylinder rotates and the set of scanning beams moves parallel to the axis of the cylinder so that the entire record medium is exposed. The record medium is electronically divided into a grid of dot cells of square form and for each quadrant of the dot cell the density of the colour in question at that point in the original image is determined and the scanning beams are caused to generate a portion of a dot whose size relative to the dot cell is determined in accordance with that colour density. In practice, the half-tone image will be represented by four colour separations representing the densities of cyan, magenta, yellow, and black in the original image.

Typically, each pixel of the original, scanned image corresponds to approximately one quadrant of a dot cell. This is generally satisfactory when the resolution is relatively low (ie. graphics resolution) for example $9 \times 10^4$ to $12 \times 10^4$ pixels per square inch. However, even with an image containing solely graphics information, the edge of a graphics feature can appear ragged due to the relatively large size of a quadrant of a dot cell. Further problems arise when it is desired to combine graphics information with high resolution information such as text. Typically, when an image is scanned at high resolution there will be between $81 \times 10^4$ and $144 \times 10^4$ pixels per square inch. The main problem arises at the junction between image portions at low and high resolution. In particular, ragged edges or stepping will occur.

U.S. Pat. No. 4,276,567 describes a method of generating a half-tone image at a single resolution but with the ability to modify the edge of the image to minimise the stepping problem. The disclosure in that specification does not consider the problem of combining areas of high and low resolution.

GB-A-2102240 describes a method for composing and recording a picture having a continuous gradation and a character having two value levels such as white and black. This method, in a similar way to the method described in the U.S. specification mentioned above, enables a "high resolution edge" to be provided around a graphics resolution feature of the image but provides a very crude method for generating high resolution information. In this example the high resolution information has just two levels, white or black. The apparatus involved causes the half-tone dot generator used when recording graphics resolution information to be bypassed when high resolution text information is to be recorded. This does not solve the problem of the junctions between edges of different resolution.

SUMMARY OF THE INVENTION

In accordance with one aspect of the present invention, a method of generating a representation of a half-tone image including areas of different resolution in which a record medium is exposed to a plurality of scanning beams arranged side-by-side comprises controlling the beams in response to previously generated image data and half-tone dot information during relative scanning movement between the beams and the record medium, and is characterised in that the image data comprises both high and low resolution data; and in that the plurality of beams are controlled together and at a first rate in response to low resolution data and singly or in groups and at a higher, second rate in response to high resolution image data, whereby a representation of a half-tone image is generated having areas of high and low resolution.

The invention provides a much more sophisticated solution to the problems mentioned above by recording the high resolution data in half-tone form as well as the low resolution images. This means that a much smoother gradation can be achieved between areas of different resolution. A further important advantage is that a continuous gradation of tone is available for high resolution images. Thus, for example, not only can 100% dot density black text be recorded on a graphics background without the problems of stepping but also a range of 6,770,000 different colours of high resolution image can also be recorded. Indeed, one high resolution image can be recorded in another, or a high resolution image of more than one colour can be recorded. This is not possible with the method and apparatus described in GB-A-2,102,240.

A further advantage of the invention is that the time taken to produce an image having both low and high resolution areas will be the same as if that image was reproduced soley at low resolution since high resolution is achieved by separately controlling each or groups of the scanning beams at a higher rate.

At junctions between low and high resolution areas, the beams will normally be controlled preferentially in response to high resolution data.

In the past, when text was to be included within an otherwise low resolution image, it has been the practice to leave gaps in the main image defined by a number of colour separations and then to register both colour separations and the text separation together. However, registration between the separations is not always accurate and this can lead to a border developing around the edge of the text. In order to overcome this problem, when the beams are controlled in response to high resolution data, the method further comprises overriding that control to control the beams in response to low resolution data for at least one colour separation. The advantage of this is that for those colour separations for which the control has been overridden, an image is generated underneath the text during printing so that any slight misregistration will not result in a border being formed around the text.

The image data which will typically be digital colour data may have been derived in any conventional manner or have been generated electronically. In particular, the image data may have resulted from the scanning of images (including text) at low and high resolutions. In this context, by image we include image portions.

Preferably, the method comprises comparing each successive discrete position of the beams relative to the record medium with previously generated spatial data, the spatial data indicating whether the beams are to be controlled in response to low resolution or high resolution image data.

In accordance with a second aspect of the present invention, apparatus for generating a representation of a half-tone image including areas of different resolution comprises first storage means for storing digital colour data representing colour density information at both low and high resolution; second storage means for storing spatial data indicating the type of image data to be used at each position on a record medium; third storage means for storing half-tone dot information; scanning beam generating means for generating a plurality of scanning beams arranged side by side; a support for supporting the record medium to be exposed to the scanning beams; means for causing relative movement between the support and the scanning beams; and scanning beam control means for determining the position of the beams relatively to the record medium in use, comparing the current position with the stored spatial data and controlling the beams in response to the previously generated digital colour data and in response to the half-tone dot information, wherein the plurality of beams are controlled together and at a first rate in response to low resolution data and singly or in groups and at a higher, second rate in response to high resolution image data. The various storage means may be provided by individual memories or two or more of the storage means may be provided by different portions of the same memory.

Conveniently, the scanning beam generating means generates six scanning beams which may be controlled individually, in one or more pairs, or in one or two triplets in response to high resolution image data. Alternatively, the plurality of scanning beams may be generated by a single scanning beam appropriately controlled to simulate the plurality of beams.

The record medium may be a light sensitive sheet onto which one or more colour separations are recorded or a gravure cylinder which is engraved by the scanning beams.

BRIEF DESCRIPTION OF THE DRAWINGS

An example of a method and apparatus in accordance with the present invention will now be described with reference to the accompanying drawings, in which.

DETAILED DESCRIPTION OF THE PREFERRED EMBODIMENTS

Figure 1:
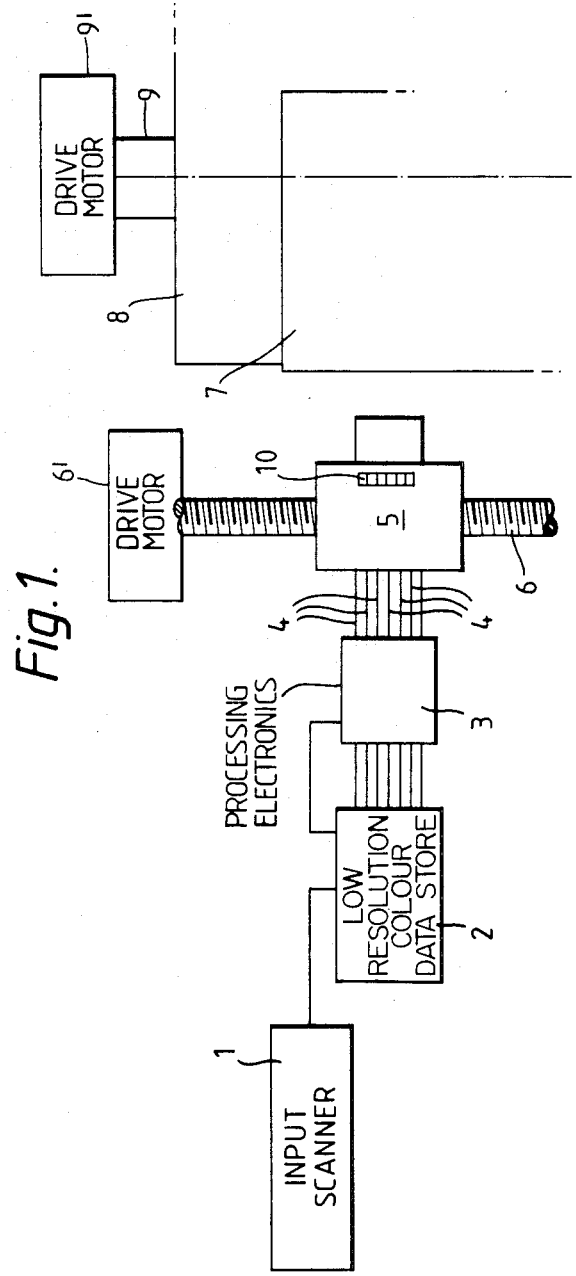
FIG. 1 is a partial schematic diagram of the apparatus.

The apparatus illustrated in FIG. 1 comprises an input scanner 1 which may be of conventional form and which generates digital colour density data which is fed to a colour data store 2. Typically, an image to be reproduced will be scanned to generate four sets of colour density data representing cyan, magenta, yellow, and black. For the sake of simplicity, we shall only describe the reproduction of a single colour separation although in practice it is possible for more than one colour separation to be prepared at the same time.

The data stored in the store 2 is fed to processing electronics 3 (to be described in more detail below) which provides six control signals on lines 4 to an exposing head 5. The exposing head 5 is mounted on a lead screw 6. A light sensitive sheet 7 is mounted on a cylinder 8 and in use relative scanning motion is achieved by rotating the cylinder 8 on its axle 9 and rotating the lead screw 6 to cause the exposing head 5 to move along the lead screw in a direction parallel to the cylinder axis. Rotation is caused by respective drive motors 6', 9'. The rotation of the lead screw 6 is slow in relation to the rotation of the cylinder 8, so that a succession of axially spaced circumferential lines are scanned on the light sensitive sheet 7 wrapped around the cylinder 8. The exposing head 5 comprises a row of side-by-side light modulators or light sources 10 which are individually controlled by the signals on the lines 4 from the processing circuitry 3. Thus, in this example, the scanning line is broken up transversely into six side-by-side areas.

In a conventional scanner, such as the Crosfield Magnascan 645, the processing circuitry 3 effectively divides the surface of the light sensitive sheet 7 into a grid of dot cells and during relative movement between the light sensitive sheet 7 and the scanning laser beams, the circuitry 3 determines for each quadrant of each dot cell the corresponding colour density data stored by the store 2. In accordance with that information and half-tone dot information, the circuitry 3 and beam computers (not shown) in the exposing head 5 then control the on/off conditions of the light modulators 10 so that a half-tone dot is generated on the light sensitive sheet 7 having a size which is related to the appropriate colour densities.

Figure 2:
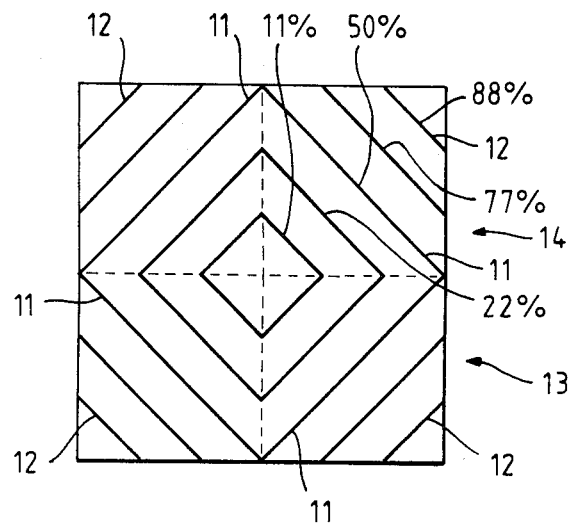
FIG. 2 illustrates the degree to which a dot cell is filled in accordance with scanned intensity.

A store 2' (FIG. 5) of the processing electronics 3 stores half-tone dot information relating to a single dot cell and this is illustrated in FIG. 2. A typical dot cell is broken down into a large number of sub units (not shown in FIG. 2), each sub unit containing information for controlling the light modulators 10. Thus, if a pixel of the scanned image is determined to have an intensity for a particular colour component which is 50 percent that of the maximum intensity possible, then the light modulators will be controlled in accordance with the information shown in FIG. 2 so that the area within the lines 11 will be exposed. If the intensity was 88 percent then the area within the lines 12 would be exposed. Conventionally, when the original image is scanned at low resolution (graphics resolution) then each pixel scanned will correspond to one quarter of a dot cell shown in FIG. 2. Thus, it is possible for asymmetrical dot cells to be exposed on the light sensitive sheet 7 for example due to an area within a line 11 being exposed corresponding to 50 percent intensity in a quadrant 13 and an area within a line 12 being exposed corresponding to 88 percent intensity in a quadrant 14. Normally, the six beams generated by the light modulators 10 expose half a dot cell in a single pass, for example corresponding to the quadrants 13, 14 in FIG. 2. Reproduction at graphics resolution is generally acceptable except where junctions between high and low resolution images occur and at the edges of images.

Figure 3A:
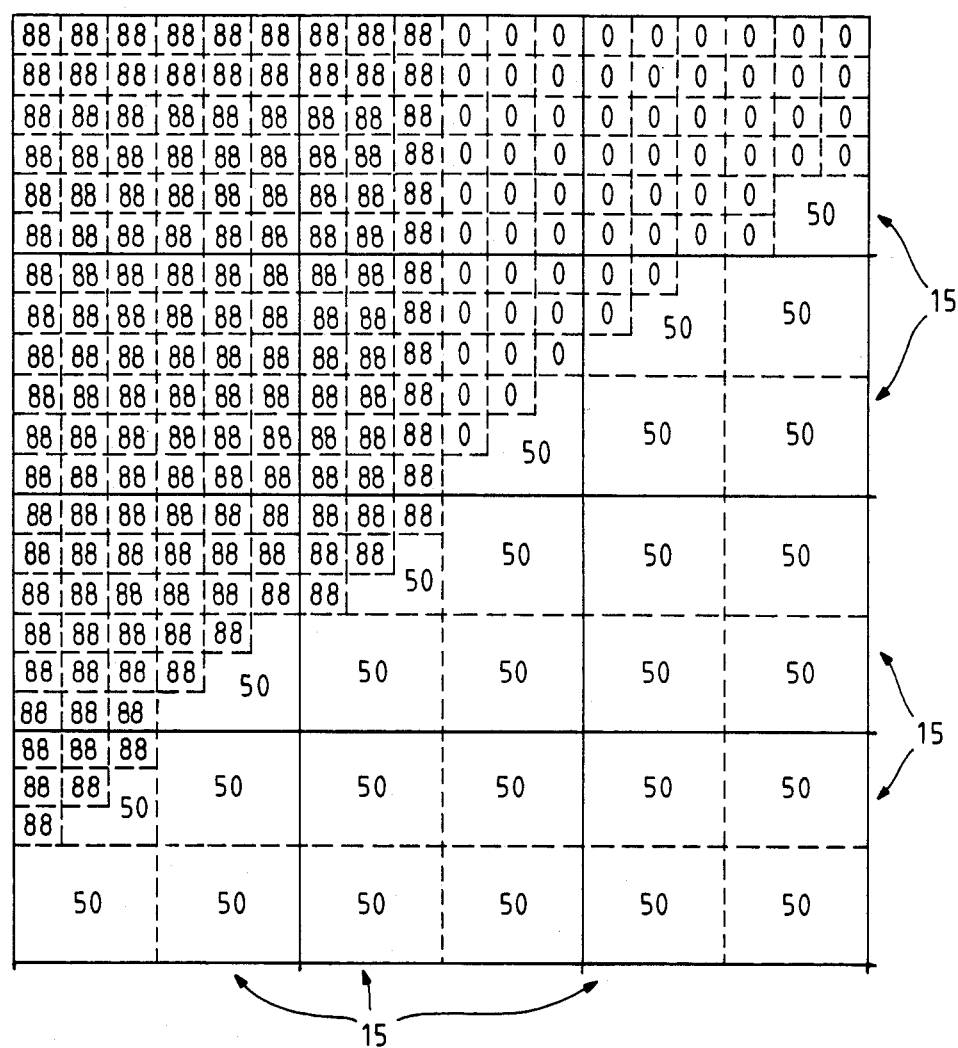
FIGS. 3A and 3B illustrate in considerably enlarged form how the scanned image is stored in a memory and the appearance of the half-tone image respectively.

In one example of the present invention, two images are scanned by the input scanner 1. Firstly, a low resolution (graphics) image, and secondly a high resolution image. Typically, the low resolution image will be scanned at 300 lines per inch in the axial direction of a scanning cylinder and at 300 pixels per inch in the circumferential direction of the scanning cylinder. The high resolution image will be scanned at 900 lines per inch in the axial direction and 900 pixels per inch in the circumferential direction. Thus, each dot cell corresponds to four graphics pixels or 36 high resolution pixels. The input scanner 1 generates for each pixel a value representing the intensity of a particular colour as a percentage of a maximum intensity and this information is stored. FIG. 3A illustrates a small portion of the information which is stored corresponding to twelve dot cells. In practice, the information is not stored in exactly the way shown in FIG. 3A and this will be described later. The twelve dot cells in FIG. 3A are indicated by the reference numerals 15. It is intended that a portion of the graphics image will be recorded in generally the right hand portion of the area while the high resolution image will be recorded in the left hand, upper portion of the area. The remaining portion of the area, at least for this particular colour separation, has zero intensity but is "recorded" at high resolution in order to smooth the edge of the graphics image at this point.

For convenience, the graphics image covering this area has a constant intensity of 50 percent while the high resolution image has a constant intensity of 88 percent. As has previously been explained, each dot cell 15 comprises four graphics cells with those applicable containing the information for 50 percent intensity. Each dot cell 15 can also be broken down into 36 high resolution cells and these each contain information indicating 88 percent intensity.

Figure 3B:
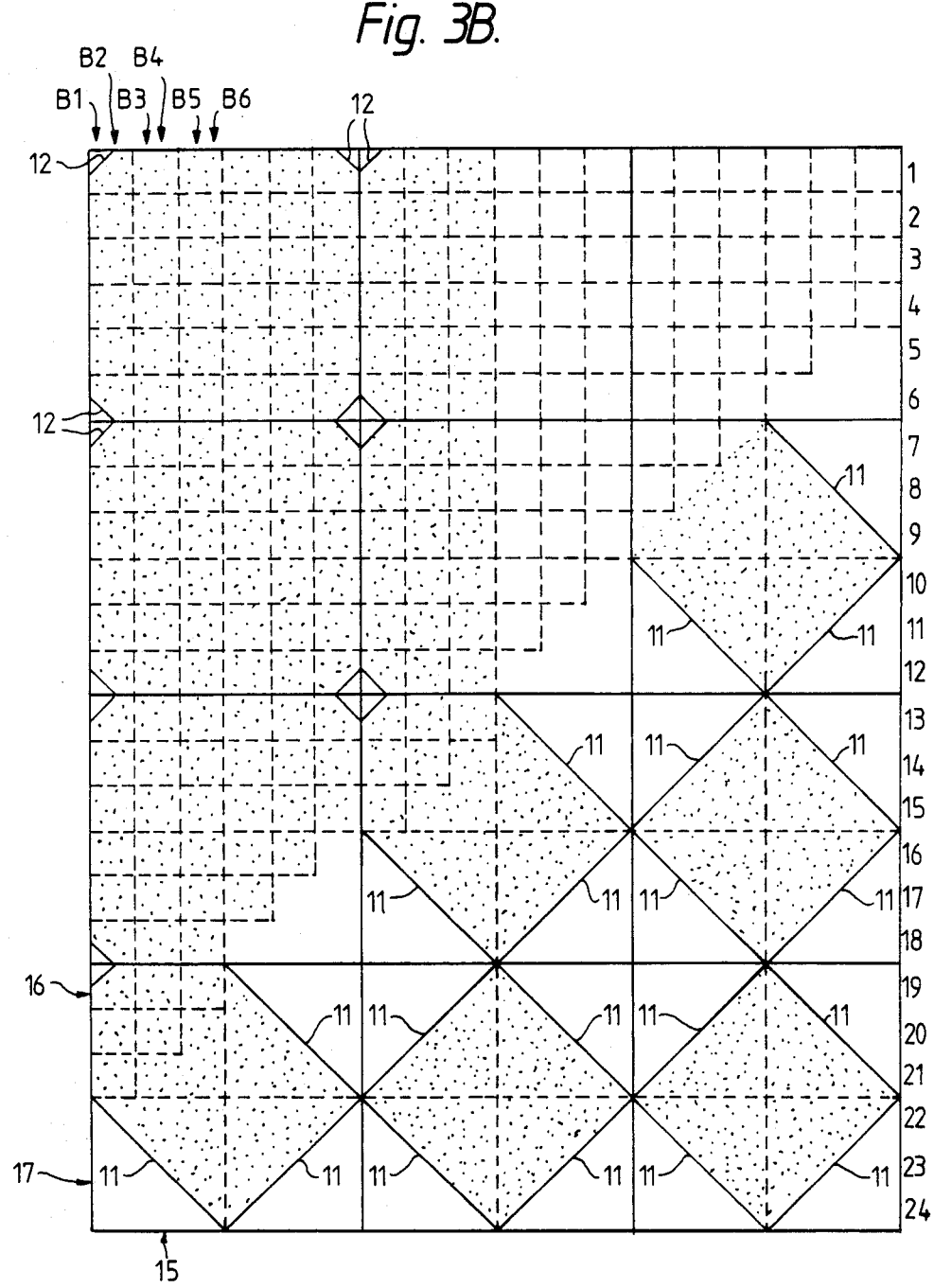

In operation, and as will be explained in more detail below, rotation of the cylinder 8 and the lead screw 6 causes the six light beams generated by the light modulators 10 to scan across the light sensitive sheet 7. The light modulators 10 are supplied with control information from the processing electronics 3. As is shown in FIG. 3B, the six beams (labelled B1–B6) generated by the light modulators 10 scan down the paper in the circumferential direction of the cylinder 8. When information corresponding to a high resolution image is supplied the beams are divided into three pairs as illustrated in FIG. 3B. In this way, each dot cell is divided into six columns in the axial direction (across the page in FIG. 3B) of the cylinder 8. Additionally, the beams are switched at three times the normal rate to divide the dot cell into six rows.

For ease of comparison, the dot cells, graphics cells and high resolution cells are indicated in FIG. 3B although they have no physical existance. As scanning begins, initially the beams B1–B6 are controlled to generate high resolution information and are thus controlled in pairs. FIG. 3A illustrates that the first information fed to these beam pairs is 88 percent intensity and this corresponds to the line 12 in FIG. 2. The beam pairs will thus expose almost all the light sensitive sheet in this pass except for those portions not within the line 12 of each dot cell 15. As the beams B1–B6 reach the lower left hand dot cell 15 they will initially be controlled at high resolution as before but after exposing a first row 16 of three high resolution cells the beam pair B5, B6, will be controlled by low resolution information whereas the other two beam pairs will continue to be controlled by high resolution information. Thus, the beam pair B5, B6 will expose the light sensitive medium since that part of the light sensitive medium is within the line 11 (FIG. 2) of the dot cell 15. At this point, the beam pair B3, B4 will also change to generate low resolution information while the beam pair B1, B2 will continue to generate high resolution information. When scanning movement causes the beams B1–B6 to scan the lowermost graphics cell 17, all the information is graphics information so the beam pair B1, B2 will switch to receive graphics information and at this stage all six beams are controlled together by the graphics information. FIG. 3A illustrates that at this point the graphics information is 50 percent intensity and so that area of the graphics cell 17 within the line 11 will be exposed. Scanning then continues over areas of the light sensitive sheet 7 in the same column (not shown in FIG. 3B) and then light beams B1–B6 scan the other half of the dot cells in the next pass.

It will be seen in FIG. 3B, that the high resolution image merges into the low resolution image without significant stepping occurring. This is assisted by controlling the beams at the junction preferentially in response to the high resolution data. Furthermore, the edge of the low resolution image is smoothed at the upper righthand portion by controlling the beams with zero intensity at high resolution.

Figure 4:
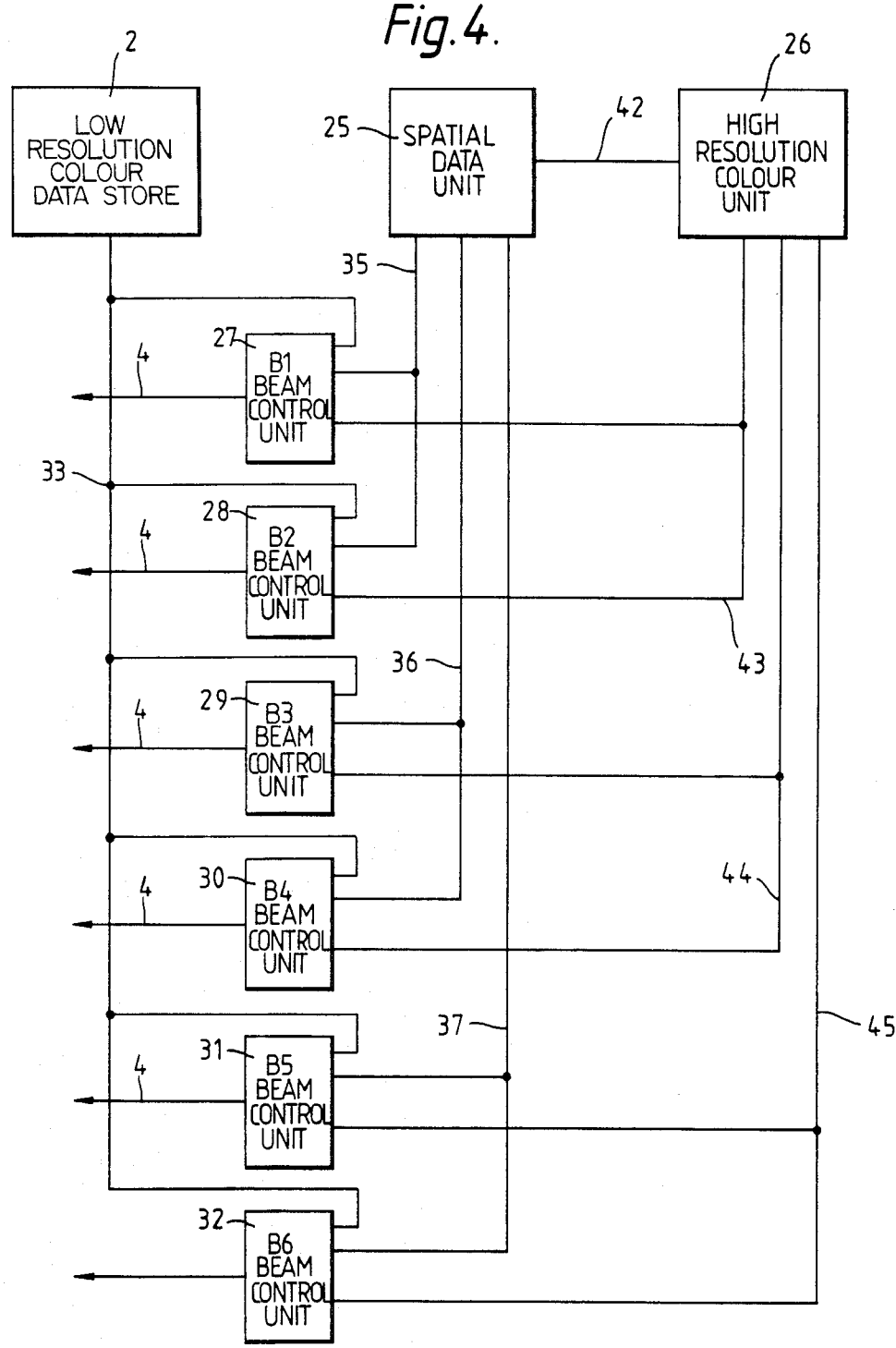
FIG. 4 is a block diagram of the processing electronics.

The processing circuitry 3 is shown in more detail in FIG. 4 and comprises a spatial data unit 25 including a 40 MB Winchester disc and associated buffer, and a high resolution colour unit 26 which includes a 20 MB Winchester disc and an associated buffer. The unit 26 also includes means for generating strobe signals to be described below. Beam control units 27–32 are provided for each light modulator 10 to which they are connected by the lines 4.

In use, the store 2 initially contains both low resolution and high resolution colour density data and also spatial data relating to each dot cell, that is whether the light modulators 10 should be controlled by high or low resolution data. Prior to initiating the exposing process, the spatial data stored in the store 2 is down loaded onto the Winchester disc of the unit 25 while the high resolution colour density data is down loaded onto the Winchester disc of the unit 26. The low resolution colour density data is retained in the store 2. In use, as each dot cell is reached due to relative movement between the exposing head 5 and the light sensitive sheet 7, the unit 25 determines whether low resolution colour density data from the store 2 should be used or high resolution colour density data from the store 26. To achieve this, the unit 25 controls the units 27–32 either to act together and to cause the light modulators 10 to modulate in accordance with low resolution colour density information on the line 33, or to act in pairs and to cause the light modulators 10 to modulate in accordance with information supplied from the unit 26 on lines 43, 44, 45. To that end, the unit 25 is connected by a line 35 to the units 27,28, a line 36 to the units 29, 30, and a line 37 to the units 31,32.

The data stored by the unit 25 consists of a series of groups of four binary digits. The last three binary digits indicate whether colour information for respective pairs of beams should be obtained from the unit 26 or from the store 2 while the first digit specifies for beam pairs receiving high resolution data whether or not there is a change in the content of that data. The store 26 contains a series of sets of data each set containing intensity information for respective pairs of beams. This information is related to the colour density of the required image at that point. Table 1 below provides an example of a set of spatial data stored in the unit 25 and a corresponding set of high resolution colour data stored in the unit 26.

TABLE 1

| POSITION | DATA IN UNIT 25 | STORE USED TO CONTROL BEAM PAIRS | | | DATA IN UNIT 26 | | |
|---|---|---|---|---|---|---|---|
| | | 1,2, | 3,4, | 5,6, | | | |
| 1 | 0000 | 2 | 2 | 2 | 100 | 100 | 100 |
| 2 | 1100 | 26 | 2 | 2 | 50 | 50 | 50 |
| 3 | 0110 | 26 | 26 | 2 | | | |
| 4 | 0111 | 26 | 26 | 26 | | | |
| 5 | 0111 | 26 | 26 | 26 | | | |
| 6 | 0111 | 26 | 26 | 26 | | | |
| 100 | 0111 | 26 | 26 | 26 | | | |
| 101 | 0011 | 2 | 26 | 26 | | | |
| 101 | 0001 | 2 | 2 | 26 | | | |
| 103 | 0000 | 2 | 2 | 2 | | | |

As the scanning beams reach the first position on the light sensitive sheet 7, it is assumed that the beam pairs were last controlled at high resolution by the first line of colour density information in the unit 26. At position 1 the first set of data in the unit 25 will be read and since the first digit is binary "0" the previous set of colour density information in the unit 26 is indicated. However, since the next three digits are all binary "0", all three sets of beams will be modulated by colour information taken from the store 2 in a conventional manner. At the next position, the spatial data contains a binary digit "1" in the first position indicating that the next set of colour density information in the unit 26 should be used for any beam pairs which are modulated with high resolution data. In this case, the first pair of beams is to be modulated by high resolution data as indicated by the binary digit "1" in the second position and the first pair of beams then takes information from the second set of data in the unit 26. This indicates that the first pair of beams should provide a 50% half-tone dot. It should be noted that this has not previously been possible with known apparatus. The other two pairs of beams however continue to produce their portions of a normal low resolution half-tone dot using information from the store 2.

At the next position, position 3, the spatial data includes a binary digit "0" in the first position indicating that the same high resolution information in the unit 26 should be used. The binary digits "1" in the second and third positions of the spatial data indicate that high resolution information from the unit 26 must be used for the first two beam pairs although the binary "0" in the last position indicates that low resolution data from the store 2 should be used for this beam pair. In this position, the first and second beam pairs are controlled to generate 50% dots.

At the position 4 the same set of high resolution data is again used, with all three beam pairs being modulated in accordance with that information.

For positions 5 to 100 the spatial data is the same as position 4 with the first binary "0" indicating that the same set of data in unit 26 is to be used. At positions 101 to 103 the beam pairs are controlled successively in an opposite way to positions 1 to 3.

The result of this is that a portion of a high resolution image is produced, the upper and lower sides of which are angled at 45° to the scanning direction.

It will be seen that this form of coding leads to a large amount of data compression in the unit 26 since only one set of data is required for this portion of a colour separation.

Table 2 below illustrates in a manner similar to Table 1 the spatial data and high resolution colour data needed to control the scanning beams on their third pass across the record medium 7 as shown in FIG. 3B. The positions mentioned in the Table correspond to each row of high resolution pixels and are labelled on the right hand side of FIG. 3B.

TABLE 2

| POSITION | DATA IN UNIT 25 | STORE USED TO CONTROL BEAM PAIRS | | | DATA IN UNIT 26 | | |
|---|---|---|---|---|---|---|---|
| | | 1,2 | 3,4 | 5,6 | | | |
| 1 | 0111 | 26 | 26 | 26 | 88 | 88 | 88 |
| 2 | 0111 | 26 | 26 | 26 | | | |
| 3 | 0111 | 26 | 26 | 26 | | | |
| 4 | 0111 | 26 | 26 | 26 | | | |
| 5 | 0111 | 26 | 26 | 26 | | | |
| 6 | 0111 | 26 | 26 | 26 | | | |
| . | | | | | | | |
| . | | | | | | | |
| . | | | | | | | |
| 13 | 0111 | 26 | 26 | 26 | | | |
| 14 | 0110 | 26 | 26 | 2 | | | |
| 15 | 0100 | 26 | 2 | 2 | | | |
| 16 | 0000 | 2 | 2 | 2 | | | |
| 17 | 0000 | 2 | 2 | 2 | | | |
| 18 | 0000 | 2 | 2 | 2 | | | |
| . | | | | | | | |

For simplicity we have only indicated the data for positions 1–6 and 13–18 since the data for positions 7–12 will correspond to positions 1–6 and the data for each position 19–24 will correspond to the data for position 18.

In this simple example, only a single set of high resolution colour data is needed in the unit 26 and since this is the same as in the previous pass the first bit of each group of four bits of spatial data is zero.

As has been previously mentioned, the ability to represent high resolution data in half-tone form enables a large variation of colours to be reproduced. A typical number is $2^{32}$.

In practice, the data in the unit 25 is stored as eight bit bytes for convenience. In other words the binary digits coding positions 1 and 2 are arranged in sequence. For this reason, the buffers provided in the units 25, 26 are dual line buffers.

Figure 5:
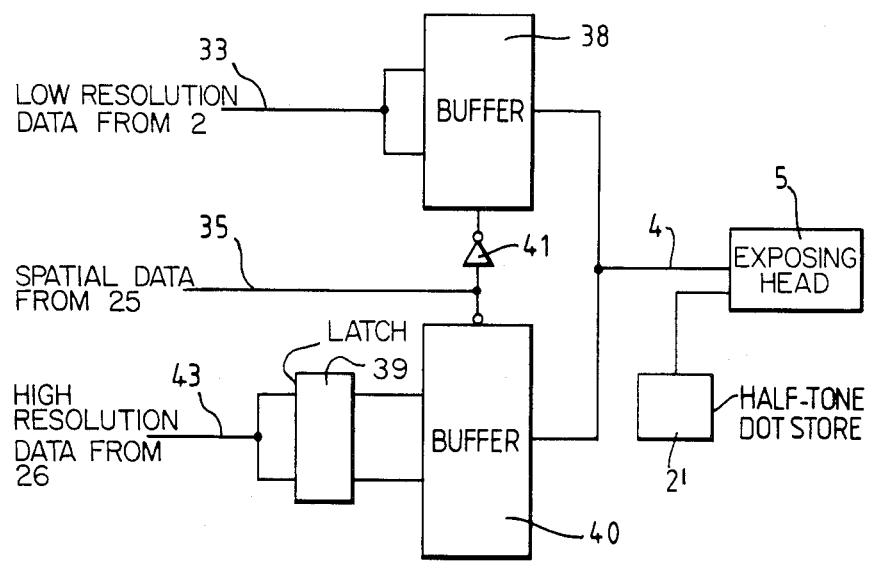
FIG. 5 is a block diagram illustrating in more detail part of the electronics shown in FIG. 4.

Each of the units 27–32 is the same and the unit 27 is shown in more detail in FIG. 5. The line 33 carrying low resolution density data from the store 2 is connected to a buffer 38 which in turn is connected to the exposing head 5. High resolution data from the unit 26 is fed via the line 43 to a latch 39 connected to a buffer 40. The unit 25 is connected via a line 35 to the buffers 38, 40, via an inverter 41.

In use, the unit 25 generates an output signal on the lines 35,36,37 if a binary digit "1" is present in the second, third or fourth positions respectively of the stored information. The receipt of a signal representing binary digit "1" on the line 35 causes the buffer 38 to switch off and the buffer 40 to switch on enabling high resolution data on the line 43 to be fed to the exposing head 5. Alternatively, if a binary digit "0" is present in the second position then the corresponding output signal on the line 35 will cause the buffer 40 to switch off and the buffer 38 to switch on allowing data from the store 2 on the line 33 to be fed to the exposing head 5. Each pair of units 27,28; 29,30; 31,32; is operated in the same way by the unit 25 so that the light modulators 10 are controlled in pairs. In addition, if a binary digit "1" is in the first position of the data stored in the unit 25 then a signal is output on a line 42 to the unit 26 indicating that the next line of high resolution colour density data should be read. In other words the high resolution data in the latch 39 should be updated. Beam computers in the exposing head 5 control the light modulators in response to the data received from the buffers 38,40 and the half-tone dot information from the store 2'.

It will be appreciated from the above description that in general high resolution information takes precedence over low resolution information. However, in some instances, for example where black text is to be included in the resultant image, this would require the generation of a gap in the other colour separations. This is undesirable since it requires precise alignment between the colour separations to avoid the generation of a border around the text. In order to overcome this, instead of storing "0" for zero intensity in relation to the high resolution information, this could be coded as "01" leaving code "0" to have a separate meaning. In this way, if code "0" is detected when reading high resolution colour information, the circuitry can be caused to override the high resolution information and to cause light modulators 10 to respond instead to low resolution information. Thus, for the non-black colour separations low resolution information will be generated where it is intended the black text should appear and no undesirable border will be generated in the final image.

It should also be understood that where a high resolution image overlies a graphics image, for each colour separation, there will exist graphics data and high resolution data. This is applied simultaneously to the beam units 27-32 which are controlled by the spatial data to pass the high resolution data to the beam modulators rather than the graphics data. However, where the high resolution image is to appear the graphics image is suppressed as explained above.

We claim:

1. A method of generating a half-tone representation of an original image including areas of low and high resolution in which a record medium is exposed to a plurality of scanning beams arranged side by side, said method comprising: controlling said beams in response to half-tone dot information and at a first rate in response to previously generated low resolution image data and at a second rate in response to previously generated high resolution image data during a relative scanning movement between said beams and said record medium; wherein said beams are controllable in selected groups of one or more of said beams, each said group of beams being individually responsive to a selected one of said low and high resolution data and to said half-tone dot information.

2. A method according to claim 1, wherein at junctions between said low and high resolution areas, said beams are normally controlled in response to said high resolution data.

3. A method according to claim 2, wherein said half-tone representation is defined by a plurality of half-tone colour separations, and wherein when said beams are controlled to expose an area of one of said colour separations in response to said high resolution data, said method further comprises selectively overriding that control to control said beams to expose a corresponding area of at least one other of said colour separations in response to said low resolution data.

4. A method according to claim 1, comprising comparing the position of said beams relative to said record medium with previously generated spatial data, said spatial data indicating whether said beams are to be controlled in response to said low resolution data or said high resolution data.

5. Apparatus for generating a half-tone representation of an original image including areas of low and high resolution, said apparatus comprising: a record medium support; scanning beam generating means for generating a plurality of scanning beams arranged side by side; means for causing relative movement between said support and said scanning beams whereby said scanning beams expose successive positions on a record medium on said support; first storage means for storing digital colour image data representing colour density information at both low and high resolutions; second storage means for storing spatial data indicating the type of image data to be used to control said scanning beams at each position on said record medium; third storage means for storing half-tone dot information; and scanning beam control means adapted to determine the position of said beams relative to said record medium, to compare the determined position with said stored spatial data, and to control said beams in response to said half-tone dot information and at a first rate in response to low resolution image data from said first storage means and at a second, higher rate in response to high resolution image data from said first storage means, wherein said beams are controllable in selected groups of one or more of said beams, each said group of beams being individually responsive to a selected one of said low and high resolution data and to said half-tone dot information.

6. Apparatus according to claim 5, wherein said scanning beam generating means generates six scanning beams arranged side by side.

7. Apparatus according to claim 5, wherein the area of the record medium exposed to said scanning beams is defined by a plurality of high resolution pixels, said spatial data comprising a control word for each high resolution pixel, each said control word comprising a selection portion for each group of beams which is controllable individually and a change portion, wherein each said selection portion indicates which of said high and said low resolution data from said first storage means is to be used to control a corresponding group of beams, and said change portion indicates whether previously-used high resolution data or new high resolution data is to be accessed from said first storage means to control any group or groups of beams selected by said selection portions to be responsive to said high resolution data.

8. Apparatus according to claim 5, wherein said scanning beam control means comprises beam modulating means for modulating each beam; and a plurality of beam control units, one for each beam, said beam control units each having first and second input ports connected to said first storage means to receive said high and low resolution data respectively, and a third input port connected to said second storage means, each beam control unit having an output port coupled with said beam modulating means and which is connectable with either said first input port receiving said high resolution data or said second input receiving said low resolution data.

* * * * *